Patented Aug. 6, 1935

2,010,059

UNITED STATES PATENT OFFICE 2,010,059

ARYLAMINOMETHYL THIAZYL SULPHIDES

Clyde Coleman, Passaic, N. J., assignor, by mesne assignments, to United States Rubber Company, New York, N. Y., a corporation of New Jersey No Drawing. Application September 5, 1931, Serial No. 561,502

26 Claims. (Cl. 260—44)

This invention relates to the preparation of a new class of chemical compounds and to the resulting products.

It has been found that by interacting a mercaptothiazole, a primary aromatic amine, and formaldehyde, under conditions precluding the elimination of hydrogen sulphide, a new class of chemical compounds is obtained. The following probable general formula is assigned to the new compounds which are referred to as arylaminomethyl thiazyl sulphide: $R_1—S—CH_2—NH—R$, wherein R is a substituted or unsubstituted aryl group and $R_1$ is a thiazyl group, for example, a benzothiazyl group. The benzothiazyl group is shown by the following structure, in which the atoms are numbered for the purposes of this invention as indicated:

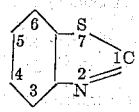

Among the mercaptothiazoles which may be reacted with the primary aromatic amine and formaldehyde are the mercaptoarylthiazoles, such as 1-mercaptobenzothiazole, and homologues and substitution products thereof, for instance 1-mercaptotoluthiazole (sometimes referred to as 1-mercaptotolylthiazole), 1-mercapto-5-nitrobenzothiazole, 1-mercapto-4-nitrobenzothiazole, 1-mercapto-5-chlorobenzothiazole, 1-mercapto-5-ethoxybenzothiazole, 1-mercapto-4-chlorobenzothiazole.

The new compounds may be prepared as illustrated in the following examples:

*Example A.*—Reaction product of mercaptobenzothiazole, formaldehyde, and ortho-toluidine having the probable formula:

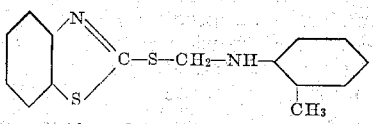

428 grams (4 mols) of ortho-toluidine are dissolved in about 1 liter of toluene, and 468 grams (4 mols) of mercaptobenzothiazole are added to the toluene solution of ortho-toluidine thus obtained, and the whole mass is thoroughly agitated, the mercaptobenzothiazole remaining largely in suspension. An aqueous solution of formaldehyde of about 38–40% strength containing 4 mols of formaldehye is then added with agitation, and cooling if necessary. A reaction between the ortho-toluidine, formaldehyde, and the mercaptobenzothiazole takes place quickly at room temperature, and the new product separates as a fine nearly white crystalline solid of a high degree of purity. The product is recovered from the supernatant liquid and freed of solvent. The melting point is about 145–146° C. The amount recovered in this way is about 960 grams (about 83% of theoretical yield). The remaining 17% remains dissolved in the toluene and may be recovered in any suitable way to give a substantially 100% yield.

*Example B.*—Reaction product of mercaptobenzothiazole, formaldehyde, and para-toluidine having the probable formula

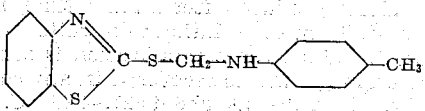

107 grams (one mol.) of para-toluidine are dissolved in about 500 cc. of alcohol, and 167 grams of mercaptobenzothiazole are then added and the mixture is thoroughly agitated. An aqueous solution of 38–40% of formaldehyde containing one mol. of formaldehyde is then added. The new product, which is the reaction product of para-toluidine, formaldehyde, and mercaptobenzothiazole, separates from the alcohol as a yellowish-white crystalline solid, and is recovered as in the previous example. The product thus obtained weighs about 195 grams. The melting point is about 107° C. which is raised to 110–111° C. by recrystallizing the product from alcohol. About 90 grams of the product remain in solution and may be recovered by any suitable means therefrom; it is identical with the first fraction isolated.

*Example C.*—Reaction product of mercaptobenzothiazole, formaldehyde and aniline having the probable formula

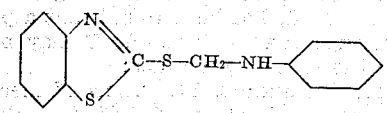

46.5 grams of aniline (0.5 mol.) and 83.5 grams of mercaptobenzothiazole (0.5 mol.) are added to 300 cc. of alcohol; the mercaptobenzothiazole remains largely in suspension while the aniline is completely dissolved, no reaction occurring between the two materials. Then an amount of formaldehyde solution of about 38% strength containing 15 grams (0.5 mol.) of formaldehyde is added and the mixture is agitated. The temperature of the reaction mixture rises to about 30° C. As the reaction proceeds, the contents of the flask begin to assume a lighter color and after about 10–15 minutes the reaction is complete. The reaction mixture is then cooled and 103 grams of the new product, a light yellow crystalline solid, are recovered by filtration. 33 grams of the product remain in solution and may be recovered, if desired, in any suitable manner. The melting point is about 103° C., which may be raised to 110–112° C. by recrystallizing the compound from any suitable solvent such as toluene. Analysis: found S, 23.4%; N, 9.7%. Calculated for $C_{14}H_{12}N_2S_2$: S, 23.5%; N, 10.2%.

*Example D.*—Reaction product of para-xylidine, formaldehyde, and mercaptobenzothiazole having the probable formula

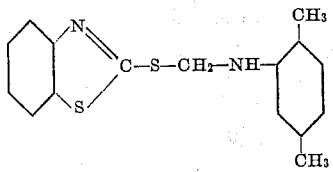

12.1 grams of para xylidine (0.1 mol.) are dissolved in about 100 cc. of alcohol, and 16.7 grams (0.1 mol.) of mercaptobenzothiazole are added. The mixture is thoroughly agitated, and an amount of formaldehyde solution of about 38% strength containing 3 grams (0.1 mol.) of formaldehyde is added. To hasten the reaction the temperature is raised to about 30° C. When substantially all of the mercaptobenzothiazole has reacted with the p-xylidine and formaldehyde, the resulting product, after a short time, begins to separate from the solution as a white, crystalline solid. When the crystallization is complete the reaction product is recovered in any suitable manner. It melts at about 119–120° C. The yield thus obtained is 27.5 grams (theoretical yield 30 grams). An additional amount of the product may be recovered from the mother liquor by any suitable means.

The method of carrying out the process in the presence of a suitable organic solvent, as illustrated in Examples A, B, C, and D, is generally applicable to the preparation of the new compounds by the reaction of formaldehyde and mercaptobenzothiazoles with any primary aromatic amine. It is preferable to employ as the reaction medium an organic solvent in which the reaction product is not too soluble. For this purpose, alcohol, benzene, toluene, and xylene are suitable. In the case of the reaction using 2,5-dichloro aniline or alpha naphthylamine it is more desirable to employ benzene, toluene, or xylene, xylene being preferable on account of the lesser solubility of the products therein and the correspondingly greater ease of recovery of the products.

Other modifications of the process may be employed as illustrated in the following examples:

*Example E.*—It has been found that a product identical with that of Example C may be prepared in the following manner:

93 grams of aniline, 167 grams of mercaptobenzothiazole and 80 cc. of 40% formaldehyde solution are mixed in a vessel with a powerful stirring apparatus, and heated to about 80° C. The contents of the vessel become fluid for a time, and as the reaction proceeds, gradually harden to a light buff homogeneous mass having melting point of 111–112° C.

*Example F.*—The same product may also be prepared in the following method:

105 grams of anhydro-formaldehyde aniline, prepared by the reaction between formaldehyde and aniline in known manner, and 167 grams of mercaptobenzothiazole are melted together with stirring. On heating for a time at about 80° C., the whole mass sets to a homogeneous solid melting at 111–112° C.

*Example G.*—The solvents which may be used in the process of Example G are the same as those which may be used in the process of Examples A, B, C, and D.

105 grams of methylene aniline are dissolved in 100 cc. of benzol; 167 grams of mercaptobenzothiazole are added, and the solution warmed to 50°–60° C. The mercaptobenzothiazole goes into solution, and soon the product of the reaction crystallizes from the solvent. It melts at 111–112° C. and is identical with the product of Example C.

The method illustrated by the process of Example E is especially suited to making condensations with such bases as aniline, o-toluidine and other fluid or low melting bases. The method illustrated by the process of Examples F and G is applicable in the case of those primary aromatic amines which are capable of forming with formaldehyde the corresponding isolable tertiary methylene bases. Examples of such amines are aniline, o-toluidine, p-toluidine, p-xylidine, p-anisidine, p-chloro-aniline, and beta naphthylamine, all of which may be made to yield the new compounds when treated according to the processes of Examples F or G, as well as by the methods of the other examples.

Examples of products which fall within the scope of the invention are shown in the following table:

| Reaction product of— | Color | Melting point |
|---|---|---|
| | | °C. |
| Mercaptobenzothiazole formaldehyde and aniline. | Buff | 111–112 |
| Mercaptobenzothiazole formaldehyde and o-toluidine. | ----do----- | 146 |
| Mercaptobenzothiazole formaldehyde and p-toluidine. | ----do----- | 110–111 |
| Mercaptobenzothiazole formaldehyde and p-xylidine. | ----do----- | 120 |
| Mercaptobenzothiazole formaldehyde and o-chlor aniline. | ----do----- | 156 |
| Mercaptobenzothiazole formaldehyde and alpha naphthylamine. | ----do----- | 125 |
| Mercaptobenzothiazole formaldehyde and p-chlor aniline. | ----do----- | 161–162 |
| 4-chloro mercaptobenzothiazole formaldehyde and aniline. | Yellowish white. | 120 |
| Mercaptobenzothiazole formaldehyde and B-naphthylamine. | Light buff | 138 |
| 4-nitro mercaptobenzothiazole formaldehyde and o-toluidine. | Yellowish orange. | 134 |
| 4-nitro mercaptobenzothiazole formaldehyde and b-naphthlyamine. | Greenish brown. | 115 |
| 4-nitro mercaptobenzothiazole formaldehyde and aniline. | Reddish orange. | 119–120 |
| Mercaptobenzothiazole formaldehyde and p-anisidine. | White | 98 |
| Mercaptobenzothiazole formaldehyde and 2-5 dichlor aniline. | Buff | 172 |

Para-formaldehyde or other polymeric forms of formaldehyde may be used in the process of the invention in place of formaldehyde.

The moderate temperatures employed in the processes of the invention cause the reactions to take place without the elimination of any sulphur-containing substances such as hydrogen sulphide; water is eliminated during the condensation of formaldehyde with the amine. All of the reaction products which fall within the scope of the invention are definite crystalline compounds.

The lability of the hydrogen atom of the mercapto group contained in mercaptothiazoles is well known, as is the tendency of such unsaturated groups as the C=N group, present in methylene aryl-imides, to become saturated by the opening up of the double bond and the addition thereto of two monovalent elements or groups, especially when one of the said elements or groups available is a labile hydrogen atom. Accordingly, the reactions of the present process are considered to proceed by the addition of the mercaptothiazole to the C=N group of a methylene aryl-imide, the methylene aryl-imide (or tertiary methylene base) being present either by direct addition to the reaction mixture as in Examples F and G, or by reason of its momentary formation in situ in the reaction mixture as in Examples A to E, inclusive. The labile hydrogen atom of the mercapto group wanders to the nitrogen of the methylene imide group, and the residue of the mercaptothiazole molecule becomes attached, through the mercapto sulphur atom, to the carbon atom of the methylene group. These changes may be illustrated by writing the equation for the reaction in the following manner:

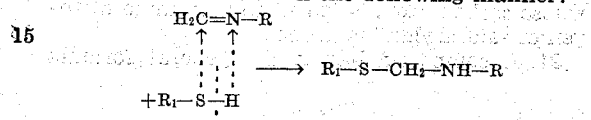

wherein R and $R_1$ are as defined above. The dotted lines indicate the respective points of attachment of the H atom and of the $R_1$—S— grouping to the C=N group. The equation also shows that the reaction takes place without the elimination of any simpler sulphur-containing substances. All of the elements of the methylene imide and of the mercaptothiazole are seen to be present in the molecule of the final product. It will also be noted that the trivalent nitrogen atom contained in the methylene aryl-imide remains trivalent in the reaction product.

In view of the preceding, it will be apparent that the formation of the reaction products of this invention involve no liberation in any form of the sulphur of the thiazole, that no hydrogen sulphide is formed, and that therefore the resulting reaction products retain the original sulphur content of the thiazole that is reacted upon.

In view of the fact that the polymeric forms of methylene aryl-imides behave chemically as if they were the simple monomers having the formula $R—N=CH_2$, it is obvious that the polymeric forms of said bases are equivalent to the corresponding monomers for the purposes of this invention, and it is to be understood that the expression "methylene aryl-imide" as used in the claims includes both the monomeric and the polymeric forms of said bases. By monomeric is meant the simple monomers having the formula $R—N=CH_2$, and by polymeric is meant the polymers of the said simple monomers.

The compounds as new chemicals are not to be restricted to the particular methods of preparing them as set forth in detail above, and the claims are to be construed as covering the compounds as new chemicals, however prepared.

One use of the new compounds is as accelerators in the vulcanization of rubber.

With the detailed description given above, it will be obvious that modifications will suggest themselves without departing from the principle of the invention, and it is not desired to limit the invention otherwise than as set forth in the appended claims.

Having thus described my invention, what I claim and desire to protect by Letters Patent is:

1. As a chemical compound the product of reaction of a mercaptobenzothiazole, formaldehyde and a primary aromatic amine chosen from the benzene and naphthalene series, said compound retaining the original sulphur content of the thiazole reacted upon and having the probable general formula $R_1$—S—$CH_2$—NH—R where R is an aryl group chosen from the benzene and naphthalene series and $R_1$ is a benzothiazyl group.

2. As a chemical compound the product of reaction of a mercaptobenzothiazole, formaldehyde and a primary aromatic amine chosen from the benzene and naphthalene series, having the probable general formula $R_1$—S—$CH_2$—NH—R where R is an aryl group chosen from the benzene and naphthalene series and $R_1$ is a benzothiazyl group said compound retaining the original sulphur content of the thiazole reacted upon.

3. As a chemical compound the product of reaction of a mercaptobenzothiazole, formaldehyde and aniline, having the probable general formula $R_1$—S—$CH_2$—NH—$C_6H_5$ wherein $R_1$ is a benzothiazyl group said compound retaining the original sulphur content of the thiazole reacted upon.

4. As a chemical compound the product of reaction of a mercaptobenzothiazole, formaldehyde, and a toluidine, having the probable formula $R_1$—S—$CH_2$—NH—$C_6H_4$—$CH_3$ wherein $R_1$ is a benzothiazyl group said compound retaining the original sulphur content of the thiazole reacted upon.

5. A compound having the probable general formula $R_1$—S—$CH_2$—NH—R wherein R is an aryl group chosen from the benzene and naphthalene series and $R_1$ is a benzothiazyl group, which compound is a crystalline solid, soluble in alcohol and in benzol.

6. As a chemical compound the reaction product of mercaptobenzothiazole, formaldehyde, and aniline, having the probable formula

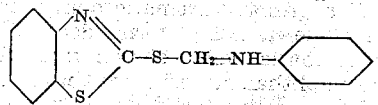

and melting at about 110–112° C. after recrystallization from toluene said compound retaining the original sulphur content of the thiazole reacted upon.

7. As a chemical compound the product of reaction of mercaptobenzothiazole, formaldehyde, and a toluidine having the probable formula

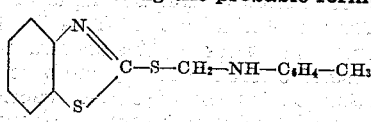

said compound retaining the original sulphur content of the thiazole reacted upon.

8. As a chemical compound the product of reaction of mercaptobenzothiazole, formaldehyde, and o-toluidine, having the probable formula

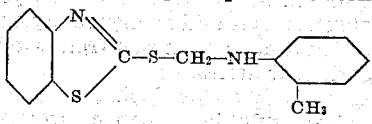

and melting at about 145–146° C. after recrystallization from alcohol said compound retaining the original sulphur content of the thiazole reacted upon.

9. As a chemical compound the product of reaction of mercaptobenzothiazole, formaldehyde, and p-toluidine having the probable formula

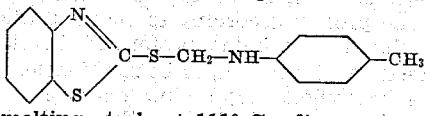

and melting at about 111° C. after recrystallization from alcohol said compound retaining the original sulphur content of the thiazole reacted upon.

10. A process of producing a methylene aryl-amino derivative of a mercapto-benzothiazole which comprises reacting a mercapto-benzothiazole, formaldehyde and a primary aromatic amine chosen from the benzene and naphthalene series at a temperature sufficiently moderate to cause no elimination of hydrogen sulphide from the reaction mixture, whereby the resulting product retains the original sulphur content of the mercapto-benzothiazole reacted upon.

11. A process of producing a methylene arylamino derivative of mercapto-benzothiazole which comprises reacting mercapto-benzothiazole, formaldehyde and a primary aromatic amine chosen from the benzene and naphthalene series at a temperature sufficiently moderate to cause no elimination of hydrogen sulphide from the reaction mixture, whereby the resulting product retains the original sulphur content of the mercapto-benzothiazole reacted upon.

12. In the process of producing a reaction product of a mercaptoarylthiazole of the benzene series, formaldehyde, and a primary aromatic amine, the steps which include reacting formaldehyde with a primary aromatic amine chosen from the benzene and naphthalene series capable of forming therewith an isolable tertiary methylene base to form such tertiary methylene base, and reacting such base with a mercaptoarylthiazole of the benzene series at temperatures not in excess of about 80° C.

13. In the process of producing a reaction product of a mercaptobenzothiazole, formaldehyde, and a primary aromatic amine, the steps which include reacting formaldehyde with a primary aromatic amine chosen from the benzene and naphthalene series capable of forming therewith an isolable tertiary methylene base to form such tertiary methylene base, and reacting such base with a mercaptobenzothiazole at temperatures not in excess of about 80° C.

14. In the process of producing a reaction product of a mercaptobenzothiazole, formaldehyde, and a primary aromatic amine, the steps which include reacting formaldehyde with a primary aromatic amine chosen from the benzene and naphthalene series capable of forming therewith an isolable tertiary methylene base to form such tertiary methylene base, and reacting such base with mercaptobenzothiazole at temperatures not in excess of about 80° C.

15. The process of producing an arylaminomethyl thiazyl sulphide which comprises effecting a reaction at temperatures not in excess of about 80° C. between a mercaptoarylthiazole of the benzene series and an arylmethylene-imide having the aryl portion chosen from the benzene and naphthalene series.

16. The process of producing an arylaminomethyl thiazyl sulphide which comprises effecting a reaction at temperatures not in excess of about 80° C. between a mercaptobenzothiazole and an arylmethylene-imide having the aryl portion chosen from the benzene and naphthalene series.

17. The process according to claim 16 wherein the arylmethylene-imide is preformed.

18. The process according to claim 16 wherein the arylmethylene-imide is formed in situ in the presence of a mercapto-benzothiazole.

19. A methylene arylamino derivative of a mercaptobenzothiazole having the general formula

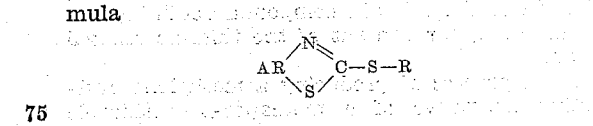

where AR is an arylene group of the benzene series, and R is a methylene arylamino group having the aryl portion chosen from the benzene and naphthalene series.

20. A compound having the general formula

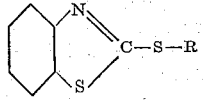

in which R consists of an arylamino group having the aryl portion chosen from the benzene and naphthalene series and a methylene radical whose carbon atom is joined to the amino nitrogen of said arylamino group.

21. A compound having the general formula

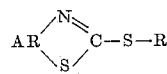

where AR is an arylene group of the benzene series and R consists of a methylene radical and an arylamino group the aryl portion of which is chosen from the benzene and naphthalene series.

22. A methylene arylamino derivative of a mercapto-benzothiazole having the general formula

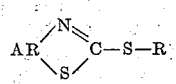

where AR is an arylene group of the benzene series and R is a methylene phenylamino group.

23. A methylene arylamino derivative of a mercapto-benzothiazole having the general formula

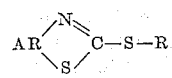

where AR is an arylene group of the benzene series and R is a methylene tolylamino group.

24. A methylene arylamino derivative of mercapto-benzothiazole having the general formula

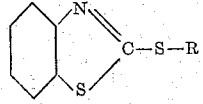

where R is a methylene phenylamino group, and having a melting point of about 110-112° C. after re-crystallization from toluene.

25. A methylene arylamino derivative of mercapto-benzothiazole having the general formula

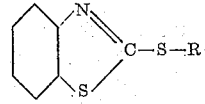

where R is a methylene o-tolylamino group and having a melting point of about 145 to 146° C. after re-crystallization from alcohol.

26. A methylene arylamino derivative of mercapto-benzothiazole having the general formula

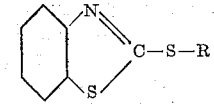

where R is a methylene p-tolylamino group, and having a melting point of about 111° C. after re-crystallization from alcohol.

CLYDE COLEMAN.